United States Patent [19]
Sartore

[11] Patent Number: 6,164,469
[45] Date of Patent: Dec. 26, 2000

[54] THERMAL INSULATED BOTTLE

[76] Inventor: Almerigo Sartore, Via Velo, 47, 35014 Fontaniva, Italy

[21] Appl. No.: 09/284,007

[22] PCT Filed: Jul. 31, 1998

[86] PCT No.: PCT/IT98/00225

§ 371 Date: Apr. 5, 1999

§ 102(e) Date: Apr. 5, 1999

[87] PCT Pub. No.: WO99/07270

PCT Pub. Date: Feb. 18, 1999

[30] Foreign Application Priority Data

Aug. 5, 1997 [IT] Italy .................................. V197A0129
Jan. 22, 1998 [IT] Italy .................................. V198U0012

[51] Int. Cl.⁷ .................................................. A47J 41/02
[52] U.S. Cl. ...................... 215/12.1; 215/13.1; 215/11.6; 220/665; 374/141
[58] Field of Search .................................. 215/12.1, 13.1, 215/11.6; 374/150, 141; 220/708, 662, 665

[56] References Cited

U.S. PATENT DOCUMENTS

| | | | |
|---|---|---|---|
| 1,706,034 | 3/1929 | Moore | 215/11.6 |
| 2,091,605 | 8/1937 | McCarty . | |
| 3,125,984 | 3/1964 | Okuyama | 215/11.2 X |
| 3,864,976 | 2/1975 | Parker | 215/11.2 |
| 4,372,453 | 2/1983 | Branscum | 220/665 X |
| 4,399,919 | 8/1983 | Posnansky et al. . | |
| 4,720,023 | 1/1988 | Jeff | 220/592.17 |
| 4,789,073 | 12/1988 | Fine | 215/13.1 |
| 4,813,541 | 3/1989 | Velasco et al. | 206/459 |
| 4,877,177 | 10/1989 | Felix | 229/92.3 |
| 4,878,588 | 11/1989 | Ephraim . | |
| 5,069,351 | 12/1991 | Gunderson et al. | 215/13.1 X |
| 5,150,815 | 9/1992 | Saklad | 220/708 |
| 5,156,284 | 10/1992 | del Pilar Pla Rodriguez et al. . | |
| 5,282,541 | 2/1994 | Chen | 215/229 |
| 5,316,193 | 5/1994 | Heiberger | 215/11.3 X |
| 5,339,982 | 8/1994 | Tardie | 220/708 |
| 5,482,373 | 1/1996 | Hutchinson | 374/141 |
| 5,529,217 | 6/1996 | Siegel | 222/131 |
| 5,573,141 | 11/1996 | Chen | 220/592.17 X |
| 5,605,230 | 2/1997 | Marino, Jr. et al. | 206/534 |
| 5,894,948 | 4/1999 | Yeh | 215/12.1 |

FOREIGN PATENT DOCUMENTS 2729294 7/1996 France .
60-182920 9/1985 Japan .

*Primary Examiner*—Allan N. Shoap
*Assistant Examiner*—Tri M. Mai
*Attorney, Agent, or Firm*—Daniel O'Byrne

[57] ABSTRACT

A thermal insulated bottle comprising an inner container (2) adapted to receive a liquid, enclosed within an outer housing (3) and coupled thereto by sealing connection elements (4) to define therebetween a substantially airtight hollow space (5), ornamental and/or indicating elements (20,21) associated with the bottle and visible from the outside. The ornamental and/or indicating elements (20,21) are located within the hollow space (5). At least a part of the housing (3) is made of a uniform material transparent to light, chosen among thermoplastics materials including polyethylene, polypropylenes, PVC, polycarbonate. The ornamental elements consist of a label or film (20) made of paper, plastics and other similar materials, loosely inserted within the hollow space (5). The indicating elements comprise thermometric element (21) consisting of a heatsensitive band (22) affixed to the outer surface of the lateral wall (6) of the inner container (2).

8 Claims, 1 Drawing Sheet

THERMAL INSULATED BOTTLE

TECHNICAL FIELD

The present invention relates to a thermal insulated bottle, particularly adapted for sports and leisure, as well as for home and professional activities. More particularly, the thermal insulated bottle according to the invention is of the type comprising an inner container enclosed within an outer housing and coupled thereto by sealing connecting means to define therebetween a substantially airtight hollow space, ornamental and/or indicating elements associated with the bottle and visible from the outside.

BACKGROUND ART

Thermal insulated bottles are known which have the inner container and the outer housing generally made of the same basic material such as for example aluminium or plastics and are not optically transparent so as to reduce heat transmission induced by the light. The ornamental and/or indicating elements normally consist of labels which are either attached to the outer surface of the housing or directly printed on this latter.

A drawback of the known aluminium bottles resides in that they are subject to permanent deformation and to scratches caused by impacts. Moreover, also the ornamental and indicating elements may suffer damages consequent to abrasions and hits thereby detracting the overall appearance and attractiveness of the bottle.

A drawback of the known plastics bottles reside in that the paints used for the ornamental elements, the inscriptions and the decorations may release smells at relatively high temperature. In addition, even though the sidewalls of the housing have an impact resistance higher than that of the aluminium bottles, in this case the decorating and the indicating elements can be easily removed from hits or abrasions and can be damaged by atmospheric agents. A problem of the known thermal insulated bottles is that in several cases it may be helpful or necessary to know the temperature of the liquid contained in the bottle, in order to avoid burning when drinking too hot liquids or to avoid dispensing of liquids too cool for several uses.

A simple method for measuring the temperature of the liquid would be that of introducing a thermometer into the inner container or attaching it to a closure of the bottle, however this would render the bottle rather cumbersome, expensive and breakable.

DISCLOSURE OF THE INVENTION

A primary object of the present invention is to obviate the above mentioned drawbacks by providing a thermal insulated bottle having ornamental and indication elements with high resistance to impacts, abrasions and atmospheric agents and which is capable to furnish to the outside information on the liquid contained in the bottle without opening it.

Another object is to provide a thermal insulated bottle which allows to know with a relatively high precision the temperature of the liquid contained in the bottle within a limited range of temperature.

These and other objects which will be clearly apparent hereinafter are accomplished by a thermal insulated bottle which comprises an inner container for receiving a liquid, a housing arranged outwardly of the container and coupled thereto by sealing connecting means to define therebetween a substantially airtight hollow space, ornamental and/or indicating elements associated with the bottle and visible from the outside, characterised in that said ornamental and/or indicating elements are located within said hollow space, said outer housing having at least a part optically transparent through which the ornamental and/or indicating elements are visible from the outside while being protected from atmospheric agents, impacts and/or abrasions. Advantageously, the outer housing can be made by a substantially uniform, clean and optically transparent material chosen among thermoplastics materials including polyethylene, polypropylene, PVC and polycarbonate or glass.

Preferably, the inner container is made of a material having a relatively high thermal conductivity chosen among aluminium, steel, glass, carbon and other natural or synthetic materials.

The ornamental elements may be constituted by a label of paper or plastics materials, loosely inserted within the hollow space or attached to the other surface of the inner container.

Alternatively, the ornamental elements may be formed by a pigmented layer printed or silk-screen printed on the outer surface of the inner container. The indicating elements may comprise thermometric means located within the hollow space and visible from the outside of the bottle to measure the temperature of the liquid contained therein.

Preferably, the thermometric means may consist of a heat-sensitive band attached to the outer surface of the inner container.

The heat-sensitive band may be formed by a strip of plastics materials on which a plurality of dots of liquid crystals are placed each adapted to change its color in correspondence of a predetermined temperature.

Appropriately the liquid crystal dots are marked with temperature values corresponding to their color-changing temperature. Thus, it will be possible to promptly measure the temperature of the liquid received within the container without introducing thermometric means within the bottle.

As the heat-sensitive band can be easily found in the market, and the inner container and the outer housing may be made of low cost materials, the bottle as a whole is relatively inexpensive and easy to manufacture.

BRIEF DESCRIPTION OF DRAWING

Further characteristics and advantages will become apparent from the following description of a preferred but not exclusive embodiment of a thermal insulated bottle according to the invention, illustrated by way of non-limiting example with the aid of the attached drawing in which.

Figure 1:
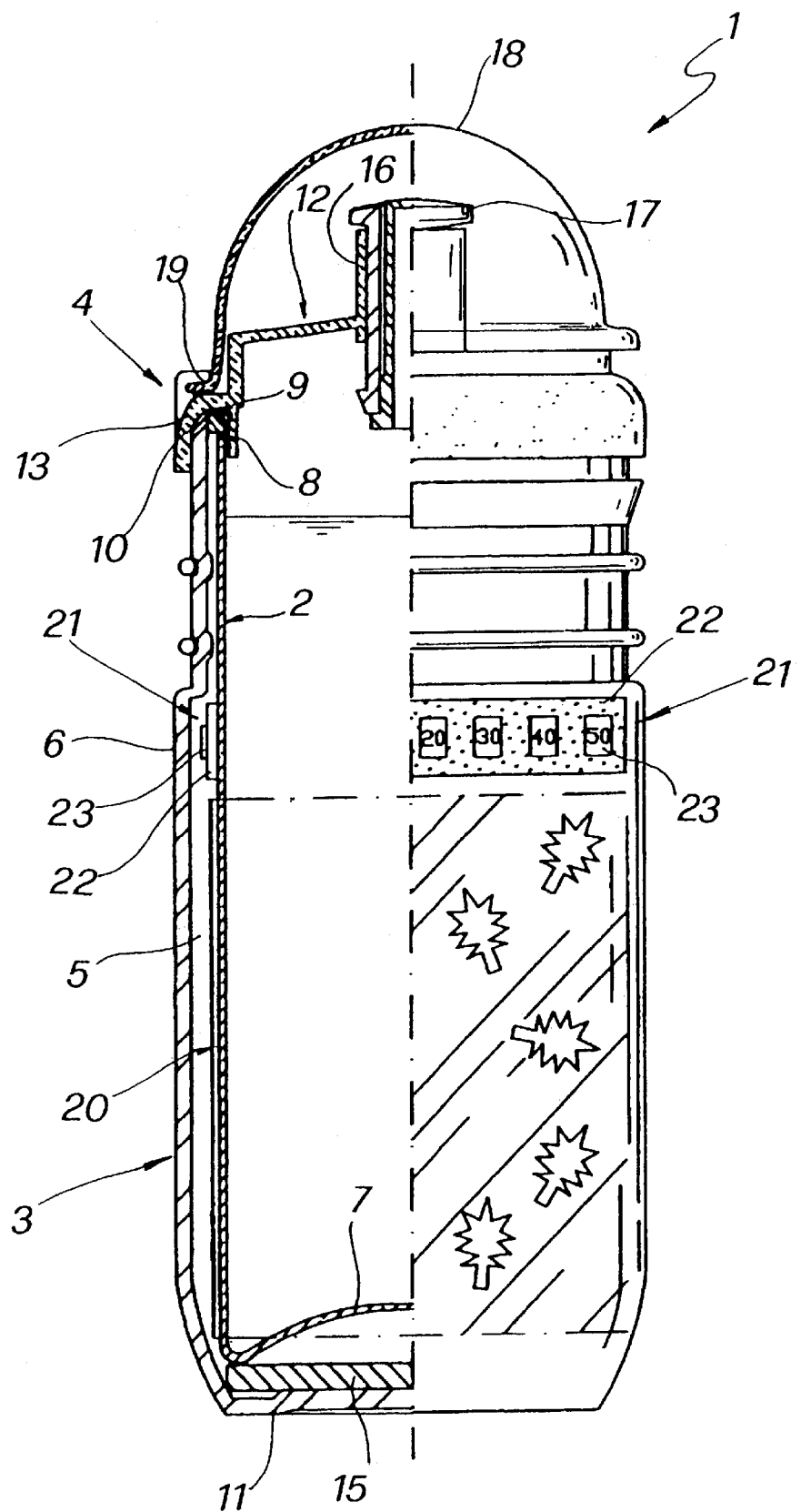
FIG. 1 is a general lateral view of the thermal insulated bottle according to the invention, partially sectioned along a vertical axial plane.

The thermal insulated bottle according to the invention, generally indicated with the reference numeral 1, is essentially formed by an inner container 2 made of a material having a relatively high thermal conductivity adapted to receive a liquid, and an outer housing 3 made of a material having a relatively low thermal conductivity. The housing 3 is radially spaced apart from the inner container 2 and is coupled thereto by a suitable connecting means 4 so as to define a substantially airtight hollow space 5 therebetween.

In a per se known manner, the inner container 2 has a lateral wall 6 of essentially cylindrical shape joined to a bottom wall 7 inwardly bulged and provided with an upper circular edge 8.

The outer housing 3 has a lateral wall 9 of similar cylindrical shape with inner diameter approximately equal to the outer diameter of the inner container 2 with an upper circular edge 10, and a substantially planar bottom wall 11.

The sealing connecting means 4 may be formed by an upper closure flange 12 having a peripheral downwardly directed formation 13 defining a seat with a substantially U-shaped cross-section to snugly fit over and engage the upper edges 8, 10 of container 2 and housing 3. An O-ring seal 14 of rubber or other resilient material is preferably interposed in the seat 13 to airtightly close the hollow space 5.

Preferably, the bottom wall 7 of the inner container 2 is spaced apart from the bottom wall 10 of the outer housing 3 by means of an intermediate layer 15 of thermally insulating material.

Thus, the container 2 and the housing 3 are mutually coupled to avoid a direct contact with each other to thereby obtain an optimum thermal insulation enhanced by the airtight hollow space 5.

The upper closure flange 12 is provided with a nozzle 16 closed by a removable plug 17 and shielded by a removable cap 18 hinged at 19. Ornamental and/or indicating elements visible from the outside are provided on bottle 1.

According to the invention, the ornamental and/or indicating elements are located within the hollow space 5. Moreover, the outer housing 3 has at least part thereof which is clear and optically transparent to allow the ornamental and/or indicating elements to be viewed from the outside while being protected from the atmospheric and mechanical agents such as impacts and abrasions.

Accordingly, the housing 3 can be made of optically transparent plastics materials such as polyethylene, polypropylene, PVC and polycarbonate, charged with additives to improve resistance thereof to impacts and abrasions, or glass.

The ornamental elements can be constituted by a label 20 of paper or a film of plastic material, printed or silk-screen printed in a per se known manner. Label 20 may be either loosely inserted within hollow space 5 or firmly attached to the outer surface of the inner container 2 by means of any suitable adhesive. As an alternative, the ornamental drawings and inscriptions present on label 20 may be directly printed or silk-screen printed on the outer surface of container 2 or on the inner surface of housing 3 using well-known four-color printing techniques. The ornamental elements may be possibly constituted by a particular finish of the outer surface of container 2 or of the inner surface of housing 3 obtained by any suitable mechanical or chemical process.

Finally, the decorations and/or inscriptions may be placed on a pigmented inner layer enclosed in a multi-layer plastic material forming the housing 3, obtained with well-known co-lamination process.

The indicating elements may include thermometric means, generally indicated with the reference numeral 21 and similarly disposed within the hollow space so as to be visible from the outside while being protected against outer atmospheric and/or mechanical agents.

The thermometric means are preferably formed by a heat-sensitive band which is anchored to the sidewall 6 of the inner container 2. More particularly, the heat-sensitive band may be formed by a thin strip 22 of plastics material attached or glued to the outer surface of the inner container 2 by means of a suitable adhesive or by other means, on which a plurality of dots 23 of liquid crystals of a given color are layered.

Thus, the container 2 with its liquid content will be placed at direct contact with the heat-sensitive band 21.

In order to promptly indicate to the outside the temperature of the liquid collected in the container 2, each of the liquid crystal dots 23 are adapted to change color when reaching a predetermined temperature. Heat-sensitive bands of the above-indicated type can be easily found on the market and are not subject of the present invention.

Advantageously, a plurality of figures corresponding to the temperatures expressed in Celsius degrees at which the change of color takes place are marked on each of the dots 23. For example, figures 20, 30, 40, 50, 60 and so on are marked on the different dots 23 for indicating the corresponding temperatures 20° C., 30° C., 40° C., 50°, 60°. Obviously, the indicated temperatures may also be different and more finely distributed and the overall range may be broader to include values comprised between 0° C. and 90° C. From the foregoing it is apparent that the thermal insulated bottle according to the invention achieves all the intended objects and particularly it is highlighted that the ornamental and indicating elements can be easily viewed from the outside while being protected by any mechanical and atmospheric agent.

What is claimed is:

1. Thermal insulated bottle, comprising:

an inner container;

a housing arranged outwardly of said inner container and coupled to said inner container by a sealing connecting device to define a substantially airtight hollow space between said inner container and said housing;

ornamental elements associated with the bottle and visible from outside the bottle, said ornamental elements being located within said hollow space, said outer housing having at least an optically transparent part through which the ornamental elements are visible from outside the bottle while being protected from atmospheric agents, impacts, and abrasions;

indicating elements located within said hollow space and visible from outside the bottle;

said inner container being made of aluminium and said housing being of optically transparent thermoplastics; and said indicating elements comprise thermometric means for indicating temperature arranged in direct contact with a side wall of said inner container.

2. Thermal insulated bottle according to claim 1, in which said optically transparent thermoplastics are chosen among polyethylene, polypropylene, PVC, and polycarbonate.

3. Thermal insulated bottle according to claim 1, in which said ornamental elements comprise a sheet-like element loosely inserted within said hollow space.

4. Thermal insulated bottle according to claim 3, in which said sheet-like element is attached to the outer surface of said inner container by means of adhesives.

5. Thermal insulated bottle according to claim 3, in which said sheet-like element is made of paper.

6. Thermal insulated bottle according to claim 3, in which said sheet-like element is made of plastics.

7. Thermal insulated bottle according to claim 1, in which said thermometric means comprises a heat-sensing band affixed to the side wall of said inner container.

8. Thermal insulated bottle according to claim 7, in which said heat-sensing band comprises a strip of plastics material on which a plurality of dots in liquid crystal are deposited, each one of said dots being adapted to change color in correspondence of a predetermined temperature.

* * * * *